United States Patent Office 3,514,117
Patented May 26, 1970

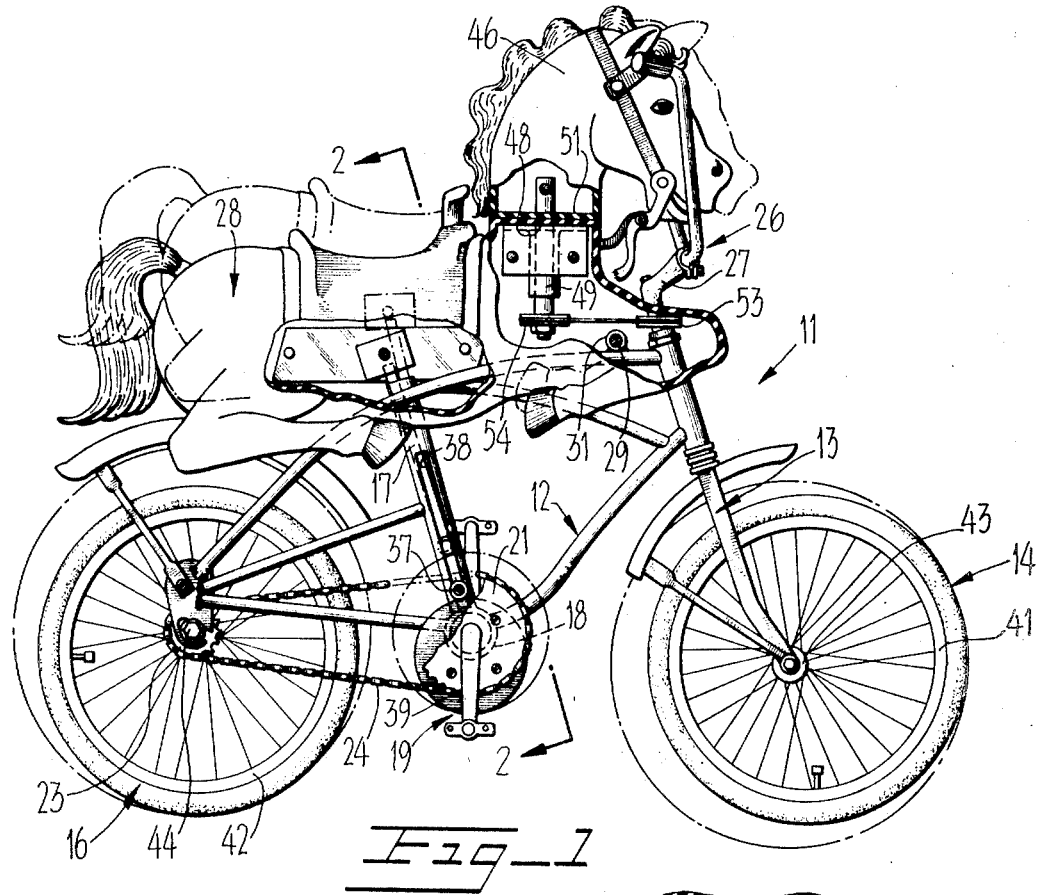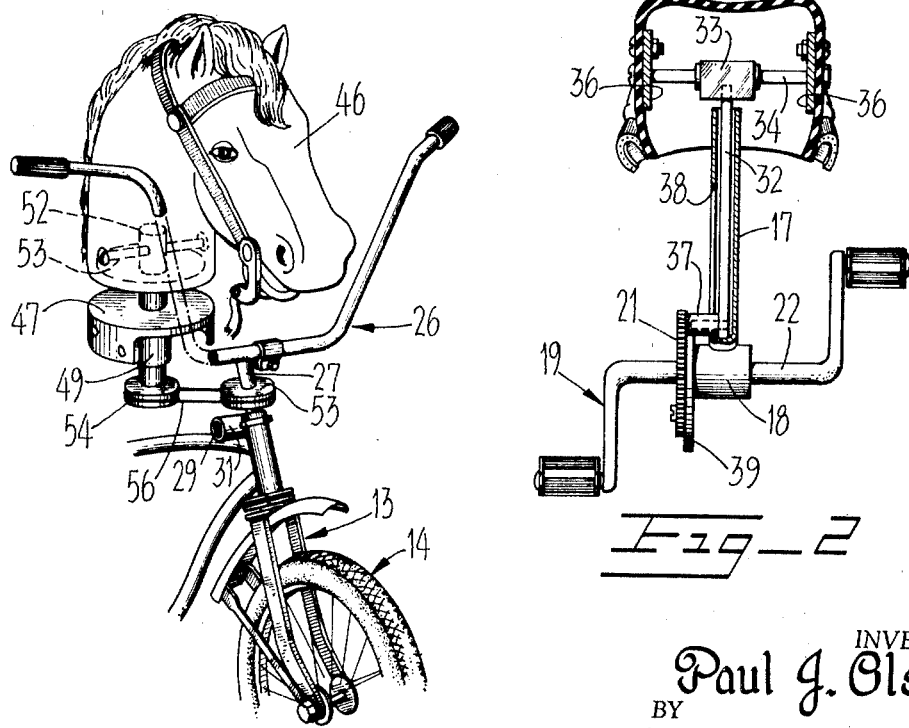

3,514,117
SIMULATED ANIMAL BICYCLE
Paul J. Olsen, 19511 Almaden Road,
San Jose, Calif. 95120
Filed Nov. 24, 1967, Ser. No. 685,625
Int. Cl. A63f *19/00*
U.S. Cl. 280—1.192
10 Claims

ABSTRACT OF THE DISCLOSURE

A bicycle which is so arranged that an animated body of a horse, or the like, associated therewith and serving as a seat undergoes an undulating motion simulating that of a horse or animal in a running motion such as a canter as the bicycle is driven forward. Not only does the animated body reciprocate regularly up and down, but in addition, the front and rear ends of the overall bicycle move up and down in a mutually random manner. The body is also provided with a head which rotates with the handle bars even though the body is reciprocating up and down.

BACKGROUND OF THE INVENTION

Bicycles have been variously modified heretofore to simulate a horse, or similar animal, in its actions and/or appearance. For example, it is not uncommon for an animated head to be mounted on the handle bars of a bicycle for rotation therewith, or for a complete animated body to be rigidly mounted on the bicycle frame to serve as the seat. By virtue of the animated appearance thus derived, the rider of the bicycle may imagine himself to be riding an animal such as a horse. However, the extent of pleasure that is produced by the modified animated appearance alone is limited since the action of the bicycle remains unchanged. The greater the action of the bicycle in simulating that of the animal represented, the greater is the pleasure to be derived by the rider. Accordingly, various arrangements have been devised to cause the animated body to undergo movement in directions additional to the usual forward movement of the bicycle, for example movement in the up and down directions. However, previous schemes to these ends have been relatively complex, and moreover have still not produced a wide latitude of action promoting movement.

SUMMARY OF THE INVENTION

The present invention relates to an animated bicycle, and more particularly, to an animated bicycle having a considerable amount of motion simulating an animal's running motion. In addition, an anmiated body serving as the seat of the bicycle is provided with a head that rotates with the handle bars so as to not obstruct the free tunring thereof.

In order to provide a substantial amount of undulating movement simulating a running motion such as a canter, the present invention generally includes means for mounting the animated body upon the bicycle frame for periodic up and down reciprocating movement relative thereto, and means for effecting up and down movement of the front and rear ends of the frame in a mutually random manner. More particularly, the front end of the body is preferably pivotally connected to the front end of the frame and a rod depends from the central portion of the body freely into a central tubular post of the frame which extends upwardly from the pedal crank journal bearing thereof. An eccentric cam carried by the pedal crank and engaging a follower projecting from the rod may then be advantageously employed to effect the up and down reciprocating movement of the body relative to the frame in response to rotation of the pedal crank. The mutually random up and down movement of the front and rear ends of the frame is preferably accomplished by the employment of eccentric mounted front and rear wheels, i.e., circular wheels whose rims are eccentric to their hubs. The relative amounts of eccentricity of the ground support points of the front and rear wheels at any given time vary in a random manner such that the overall frame moves up and down as the bicycle moves forward.

Rotation of the head of the body with the handle bars is preferably accomplished by the provision of a rotary joint between the head and neck, and a rotary drive coupling between the shank of the handle bars and the head. Turning movement of the handle bars is thus transmitted by the drive coupling to the head.

BRIEF DESCRIPTION OF THE DRAWING

FIG. 1 is a side elevational view with portions broken away of an animated pony bicycle in accordance with the present invention, various extremes of movement of components of the bicycle being illustrated in phantom.

FIG. 2 is a sectional view taken at line 2—2 of FIG. 1, illustrating particularly a preferred arrangement for effecting up and down reciprocation of the animated body of the bicycle.

FIG. 3 is a fragmentary perspective view of the front end of the bicycle and the head of the animated body, illustrating particularly a preferred arrangement for effecting rotation of the head with the handle bars.

DETAILED DESCRIPTION OF THE PREFERRED EMBODIMENT

Referring now to the drawing in detail, FIG. 1 in particular, there will be seen to be provided a bicycle 11 including a frame 12 having a turning fork 13 journalled at its front end for rotation about a substantially vertical axis in a conventional manner. A front wheel 14 is rotatably mounted between the opposite sides of the fork, while a rear wheel 16 is rotatably mounted at the rear end of the frame. The frame includes a central tubular post 17 extending upwardly at a slightly rearwardly inclined angle from a journal bearing portion 18 of the frame which serves to rotatably mount the usual pedal crank 19. A sprocket 21 is coaxially secured to the axle portion 22 of the crank, while a sprocket 23 is coaxially secured to the rear wheel 16, a continuous link chain 24 extending about both sprockets in a typical manner such that driven rotation of the rear wheel is effected in response to a pedaled rotation of the crank. Handle bars 26 having a common central shank 27 coaxially secured to the turning fork 13 are provided to effect turning of the front wheel 14 to thereby steer the bicycle.

In accordance with the particularly salient aspects of the present invention, the conventional bicycle as described to this point is modified to include an animated body 28 of a horse, or the like, which serves as the bicycle seat. The body 28 is fabricated from rubber, molded plastic, or equivalent material, is hollow, and open longitudinally of its bottom so as to be positionable in straddling relation to the frame 12. The front end of the body is pivotally connected to the front end of the frame, preferably by means of a transverse pivot pin 29 secured interiorly between the opposite sides of the body and traversing a bushing 31 secured to the front end of the frame subjacent the handle bars 26. In addition, a push rod 32 depends centrally from the body interior and extends freely into the tubular post 17 of the frame. The push rod is employed to periodically reciprocate the body up and down with respect to the pivot point defined by the pin 29 and bushing 31. More particularly, the upper end of the rod 32 is preferably secured to a collar 33 rotatably disposed on a transverse shaft 34 secured between a pair of re-enforcing plates 16 respectively, attached to the interior surfaces of the opposite sides of the body. The lower end of the rod is provided with a follower 37, such as a roller, which projects radially outward through an elongated slot 38 extending longitudinally of the post 17. The follower bears against the edge of a cam 39 secured to the axle portion 22 of the pedal crank 19 so as to be rotatable therewith and arranged to impart the desired reciprocating motion to the rod 32 responsive to crank rotation. To this end the cam is preferably circular and eccentrically secured to the axle portion 22 at a position between the bearing portion 18 of the frame and the sprocket 21, as best shown in FIG. 2. It will be thus appreciated that as the bicycle is pedaled by means of the crank 19, the body is reciprocated up and down due to the action of the cam, follower, and push rod, between the full and phantom line positions depicted in FIG. 1. It will be appreciated that cam 39 could as well be secured to crank 19 on the other side of bearing portion 18.

Further running promoting action is transmitted to the body 28 by the provision of means for effecting up and down movement of the front and rear ends of the frame 12 in a mutually random manner. As herein provided such means preferably comprise the front and rear wheels 14, 16 which are eccentric with respect to their rotational axes. More particularly, the wheels 14, 16 respectively have rims 41, 42 eccentrically secured to the hubs or axles 43, 44. It will be thus appreciated that as the bicycle moves forward, the eccentric wheels move between the full and phantom line extremes depicted in FIG. 1 to in turn move the front and rear ends of the frame up and down. These up and down movements are mutually random since they depend upon the relative eccentricities of the ground bearing points of the respective wheels at any given time, and such eccentricities may vary in an entirely random fashion. At one time, the front and rear ends of the frame may move up and down in unison, while at another time the front end may move all of the way down as the rear end moves all of the way up. At other times, the relative movements of the front and rear ends of the frame may be anything between the previously noted extremes. It will be thus appreciated that the random up and down motion of the frame in conjunction with the periodic up and down reciprocating motion of the body produces a very active cantering action which is quite exciting to the rider of the bicycle.

The head 46 of the body 28 when positioned relative to the frame 12 in the manner hereinbefore described would normally obstruct full turning of the handle bars 26. Accordingly, in accordance with an important aspect of the invention, the head 46 is arranged to turn with the handle bars even though the body is moving up and down. More particularly, the upper end of the neck of the body is provided with a circular support plate 47 having a central aperture 48 with a coaxial coextensive bushing 49 depending therefrom. The base of the head 46 has a circular closure portion 51 which rests upon the plate 47. The portion 51 is preferably transpierced by a coaxial shaft 52 rigidly secured interiorly of the head as by means of a pin 53 extending transversely between the opposite sides of the head. The depending end of the shaft 52 extends through the bushing 49 in rotatable relation thereto. The shaft 52, and therefore the head, are rotated with the handle bars 26 by means of a suitable rotary drive arrangement coupled therebetween. Such drive arrangement preferably comprises a pulley 53 coaxially secured to the shank 27 of the handle bars 26, a pulley 54 coaxially secured to the free end of shaft 52, and a continuous drive belt 56 extending about the pulleys.

I claim:

1. In a bicycle including a frame having a turning fork journalled for rotation about a substantially vertical axis at the front end thereof, handle bars having a common shank secured to said fork to rotate the same, a front wheel journalled for rotation between opposite sides of said fork, a rear wheel journalled for rotation at the rear end of said frame, a bearing portion provided by said frame and a substantially central tubular post projecting upwardly from said bearing portion, a pedal crank having an axle portion journalled for rotation in said bearing portion, and a sprocket and chain drive coupling said axle portion of said pedal crank in driving relation to said rear wheel, the combination comprising an animated body provided with a seat intermediate its ends in general alignment with with said post, means interconnecting said body and frame for up and down reciprocating motion of said body at said seat thereof relative to said frame and post, means including a push rod constrained for axial displacements along said post and being coupled between said body and said crank for effecting said reciprocating motion in response to rotation of said crank, and means associated with said front and rear wheels for moving said front and rear ends of said frame up and down in a mutually random manner in response to forward movement of said frame.

2. The combination of claim 1, further defined by said means associated with said front and rear wheels being rims eccentrically secured to the hubs of said wheels.

3. In a bicycle including a frame having a turning fork journalled for rotation about a substantially vertical axis at the front end thereof, handle bars having a common shank secured to said fork to rotate the same, a front wheel journalled for rotation between opposite sides of said fork, a rear wheel journalled for rotation at the rear end of said frame, a bearing portion provided by said frame and a substantially central tubular post projecting upwardly from said bearing portion, a pedal crank having an axle portion journalled for rotation in said bearing portion and a sprocket and chain drive coupling said axle portion of said pedal crank in driving relation to said rear wheel, the combination comprising an animatedbody, means securng said body to said frame for up and down reciprocating motion relative thereto, means coupled between said body and said crank for effecting said reciprocating motion in response to rotation of said crank, means associated with said front and rear wheels for moving said front and rear ends of said frame up and down in a mutually random manner in response to forward movement of said frame said body having a separate head portion mounted for rotation about a vertical axis with respect to the remainder of said body, and rotary drive means coupling said head portion to said handle bars for rotation therewith.

4. In a bicycle including a frame having a turning fork journalled for rotation about a substantially vertical axis at the front end thereof, handle bars having a common shank secured to said fork to rotate the same, a front wheel journalled for rotation between opposite sides of said fork, a rear wheel journalled for rotation at the rear end of said frame, a bearing portion provided by said frame and a substantially central tubular post projecting upwardly from said bearing portion, a pedal crank having and axle portion journalled for rotation in said bearing portion, and a sprocket and chain drive coupling said axle portion of said pedal crank in driving relation to said rear wheel, the combination comprising an animated body, means securing said body to said frame for up and down reciprocating motion relative thereto, means coupled between said body and said crank for effecting said reccipro-cating motion in response to rotation of said crank, means associated with said front and rear wheels for moving said front and rear ends of said frame up and down in a mutually random manner in response to forward movement of said frame, said means securing said body to said frame being a pivotal connection between the front ends of said body and said frame, and said means for effecting reciprocating motion comprising a push rod depending from said body and extending freely into said tubular post, follower means projecting radially from said push rod through a slot extending longitudinally of said post, and cam means carried by said axle portion of said crank and engaging said follower means to reciprocate the same up and down in response to crank rotation.

5. The combination of claim 4, further defined by said cam means comprising a circular cam eccentrically secured to the axle portion of said crank, said follower means bearing against the edge of said cam.

6. The combination of claim 5, further defined by said means associated with said front and rear wheels being rims eccentrically secured to the hubs of said wheels.

7. The combination of claim 4, further defined by said means associated with said front and rear wheels being rims eccentrically secured to the hubs of said wheels.

8. The combination of claim 7, further defined by said body having a neck portion and a head portion mounted for rotation with respect to said neck portion, and rotary drive means coupling said head portion to said handle bars for rotation therewith.

9. The combination of claim 8, further defined by said neck portion having a circular support plate and said head portion having a circular closure element resting coaxially upon said support plate, said support plate having a depending coaxial bushing, a shaft rigidly secured to said head portion and depending coaxially from said closure element through said bushing in rotatable relation therewith, said rotary drive means comprising a pair of pulleys respectively coaxially secured to said shaft and said shank of said handle bars, and a continuous belt extending about said pulleys.

10. The combination of claim 9, further defined by said means associated with said front and rear wheels being rims eccentrically secured to the hubs of said wheels.

References Cited
UNITED STATES PATENTS

| | | |
|---|---|---|
| D. 126,371 | 4/1941 | Schnack. |
| 671,029 | 4/1901 | Piper _____ 280—195 |
| 1,863,393 | 6/1932 | Brennan _____ 280—1.201 X |
| 2,225,560 | 12/1940 | Hartman _____ 280—1.188 |
| 2,643,133 | 6/1953 | Lucchesi _____ 280—1.208 X |

LEO FRIAGLIA, Primary Examiner

U.S. Cl. X.R.

280—229, 1.195, 1.206